United States Patent [19]

Kleiner et al.

[11] Patent Number: 4,460,480

[45] Date of Patent: Jul. 17, 1984

[54] PROTEIN HYDROLYZATE COMPOSITIONS FOR FIRE FIGHTING CONTAINING PERFLUOROALKYL SULFIDE TERMINATED OLIGOMERS

[75] Inventors: Eduard K. Kleiner, Pound Ridge; Thomas W. Cooke, Mahopac; Robert A. Falk, New City, all of N.Y.

[73] Assignee: Ciba-Geigy Corporation, Ardsley, N.Y.

[21] Appl. No.: 129,872

[22] Filed: Mar. 13, 1980

[51] Int. Cl.$^3$ .................. A62D 1/00; C07D 211/70; C07D 211/82; C07D 213/56
[52] U.S. Cl. .................. 252/8.05; 252/3; 546/336; 548/550; 548/551
[58] Field of Search .................. 252/3, 8.05; 546/336; 548/550, 551

[56] References Cited

U.S. PATENT DOCUMENTS 2,956,947 10/1960 Carter et al. .................. 252/3

Primary Examiner—Henry R. Jiles
Assistant Examiner—Robert C. Whittenbaugh
Attorney, Agent, or Firm—Michael W. Glynn

[57] ABSTRACT

The present invention relates to novel oligomers of the formula $R_f$—E—S—$[M_1]_x[M_2]_y$ H, and mixutes thereof, wherein $R_f$ is a perfluoroalkyl group, E is a linkage group, —$[M_1]$— represents a hydrophilic monomer unit, —$[M_2]$— represents a hydrophobic monomer unit, x and y represent the number of monomer units present in the novel oligomers. The sum of x and y is between 4 and 500 and $x/(x+y)$ is between 1 and 0.5. The novel oligomers are useful as additives in protein foam type fire fighting compositions improving foam expansion, foam drainage and extinguishing times and reducing flammability of hydrocarbon contaminated protein foams. The novel oligomers are further useful as surface tension depressants providing improved wetting, spreading and leveling properties in aqueous systems.

6 Claims, No Drawings

PROTEIN HYDROLYZATE COMPOSITIONS FOR FIRE FIGHTING CONTAINING PERFLUOROALKYL SULFIDE TERMINATED OLIGOMERS

BACKGROUND OF THE INVENTION

The instant invention relates to a new class of perfluoroalkyl sulfide terminated oligomers having a backbone of from 8 to 1000 carbon atoms, in addition to those of the perfluoroalkyl sulfide moiety, wherein the backbone of the oligomers are made up of hydrophilic monomer units or mixtures of hydrophilic and hydrophobic monomer units, and the incorporation thereof into protein hydrolyzate compositions for fire fighting foams.

Protein fire-fighting foams are described by J. M. Perri ("Fire Fighting Foams" in J. J. Bikerman, ed., Foams; Theory and Industrial Applications, Reinhold Publishing Corp., N.Y. 1953, pp. 189-242); also by N. O. Clark (Spec. Report No. 6, D.S.I.R., H.M. Stationary Office, London, 1947). They comprise aqueous fire fighting foams derived from such protein bases as animal proteins, principally keratins, albumins, globulins derived from horns, hoofs, hair, feathers, blood, fishscale, and vegetable proteins from soybean meal, pea flour and maize meal.

In addition such compositions may contain as stabilizers metal salts of variable valency, solvents to impart low temperature performance capability, protective colloids and saponins.

Protein foams were developed as fire-fighting agents for high risk situations involving flammable liquids in bulk, in refineries, tank farms and wherever low flash point fuels, such as gasoline, are stored. The danger that long pre-burns may build up hot zones in deep fuel layers is ever present and under such circumstances standard protein foams, however applied, quickly become contaminated with the fuel, burn themselves off and are therefore limited in their effectiveness.

Such protein hydrolyzate type of fire-fighting foam was made more effective by the addition of fluorinated surfactants, as described in U.S. Pat. No. 3,475,333 and British Pat. No. 1,245,124. These so-called fluoroprotein foam compositions are primarily used as 3% or 6% proportioning concentrates against fires in high risk situations involving bulk storage of flammable liquids. They are widely accepted by major oil and chemical companies as the superior foam extinguishing agent for the oil and petrochemical industry. They also provide optimum foam properties for controlling and extinguishing aircraft crash fires and for general use against hydrocarbon spill fires.

The $R_f$ surfactants in the aforementioned patents are incorporated in order to impart improved properties to protein-type fire fighting foams by imparting better foam mobility, reduced extinguishing times, and reduced sensitivity to hydrocarbon pick-up.

The $R_f$ surfactants disclosed in U.S. Pat. No. 3,475,333 and Br. Pat. No. 1,245,124 differ significantly in structure from the oligomers of the instant invention. Moreover, while protein foams containing $R_f$ surfactants as disclosed in the aforementioned patents are certainly beneficial in reducing extinguishing times in fighting hydrocarbon fires if compared with protein foams not containing such surfactants, the $R_f$ surfactants tend to reduce the foam expansion as well as foam drainage time of the protein foam, which are considered to be undesirable side effects because the area which can be covered with a given amount of protein foam concentrate is being reduced and because a faster draining foam shows decreased burnback resistance.

DETAILED DISCLOSURE

The present invention pertains to novel perfluoroalkyl group terminated oligomers derived from perfluoroalkyl mercaptans and hydrophilic and hydrophobic monomers via free radical polymerization, and the use of such oligomers as additives to protein foam type fire fighting compositions and as surface tension depressants for aqueous systems.

Generically, the novel oligomers may be represented by the following formula I

$$R_f\text{—E—S—}[M_1]_x[M_2]_y H \qquad (I)$$

wherein $R_f$ is a straight or branched chain perfluoroalkyl of 4 to 18 carbon atoms, perfluoroalkyloxyalkylene of 5 to 19 carbon atoms, or mixtures thereof.

E is a straight or branched chain alkylene of 1 to 12 carbon atoms, —CON(R')—E'—, —SO$_2$N(R')—E'—, —E''—CON(R')—E'—, —E''—S—E'—, —E''—N(R')—E; or —E''—SO$_2$N(R')—E'—, where R' is hydrogen or alkyl of 1 to 6 carbon atoms, E' is alkylene of 2 to 8 carbon atoms and E'' is alkylene of 1 to 4 carbon atoms; —$[M_1]$— represents a hydrophilic monomer unit derived from a hydrophilic monomer of the type $M_1$ as defined later and —$[M_2]$— represents a hydrophobic monomer unit derived from hydrophobic monomers of the type $M_2$ as defined later.

The sum of x and y is between 4 and about 500; and $x/(x+y)$ is between 1 and 0.5;

It is understood that the formula is not intended to depict the actual sequence of the oligomer units, since the units can be randomly distributed in the novel oligomer. It is also understood that the monomers from which the —$[M_1]$— and —$[M_2]$— units are derived are known, per se.

The novel oligomers of this invention are synthesized by polymerizing a hydrophilic monomer or monomers of the type $M_1$ with or without a hydrophobic monomer or monomers of the type $M_2$ in the presence of an $R_f$-mercaptan of formula II

$$R_f\text{—E—SH} \qquad (II)$$

wherein $R_f$ and E are as defined previously.

$R_f$ mercaptans of type II are described inter alia in U.S. Pat. Nos. 2,894,991; 2,961,470; 2,965,677; 3,088,849; 3,172,910; 3,554,663; 3,655,732; 3,686,283; 3,883,596; 3,886,201 and 3,935,277; and Austalian Application No. 36868; filed Apr. 24, 1968. The pertinent parts of these patents are incorporated herein by reference.

Suitable $R_f$ mercaptans can, alternatively, be easily prepared by reacting an $R_f$ acid halide, e.g. $R_f SO_2 Cl$ or $R_f COCl$ with an amino mercaptan, e.g. H—N(R')—E'—SH, in an inert solvent.

Hydrophilic monomers of the type $M_1$ which contain at least one hydrophilic group are known per se and many are commercially available, such as acrylic and methacrylic acid and salts thereof as well as hydrophilic groups containing derivatives such as their hydroxyalkyl esters, e.g., 2-hydroxyethyl, 3-hydroxypropyl, 2-hydroxypropyl or 2,3-hydroxypropyl esters; also ethoxylated and polyethoxylated hydroxyalkyl esters, such as esters of alcohols of the formula $$HO-C_mH_{2m}-O-(CH_2-CH_2-O)_n-R_1$$

wherein R represents hydrogen or methyl, m represents 2 to 5 and n represents 1 to 20 or esters of analogous alcohols, wherein a part of the ethyleneoxide units is replaced by propyleneoxide units. Further suitable esters are dialkylaminoalkyl acrylates and methacrylates, such as the 2-(dimethylamino)-ethyl-, 2-(diethylamino)-ethyl- and 3-(dimethylamino) -2-hydroxypropyl esters. Another class of hydrophilic monomers are acrylamide and methacrylamide as well as amides substituted by lower hydroxyalkyl, lower oxaalkyl- or lower dialkylaminoalkyl groups such as N-(hydroxymethyl)-acrylamide and -methacrylamide, N-(3-hydroxypropyl)-acrylamide, N-(2-hydroxyethyl)-methacrylamide, N-(1,1-dimethyl-3-oxabutyl)-acrylamide and N-[1,1-dimethyl-2-(hydroxymethyl)-3-oxabutyl)]-acrylamide; further hydrophilic monomers of interest are hydrazine derivatives, such as trialkylamine methacrylimide, e.g., trimethylamine-methacrylimide and dimethyl-(2-hydroxypropyl)amine methacrylimide and the corresponding derivatives of acrylic acid; mono-olefinic sulfonic acids and their salts, such as sodium ethylene sulfonate, sodium styrene sulfonate and 2-acrylamido-2-methylpropanesulfonic acid; N-[2-(dimethylamino)-ethyl]-acrylamide and -methacrylamide, N-[3-(dimethylamino)-2-hydroxypropyl]-methacrylamide, or mono-olefinic derivatives of heterocyclic nitrogen-containing monomers, such as N-vinyl-pyrrole, N-vinyl-succinimide, 1-vinyl-2-pyrrolidone, 1-vinyl-imidazole, 1-vinyl-indole, 2-vinyl-imidazole, 4(5)-vinyl-imidazole, 2-vinyl-1-methyl-imidazole, 5-vinyl-pyrazoline, 3-methyl-5-isopropenyl, 5-methylene-hydantoin, 3-vinyl-2-oxazolidone, 3-methacrylyl-2-oxazolidone, 3-methacrylyl-5-me-2-oxazolidone, 3-vinyl-5-methyl-2-oxazolidone, 2- and 4-vinyl-pyridine, 5-vinyl-2-methyl-pyridine, 2-vinyl-pyridine-1-oxide, 3-isopropenyl-pyridine, 2- and 4-vinyl-piperidine, 2- and 4-vinyl-quinoline, 2,4-dimethyl-6-vinyl-s-triazine, 4-acrylyl-morpholine as well as the quaternized derivatives of the above pyridines.

The above listed hydrophilic monomers of type $M_1$ can be used alone or in combination with each other as well as in combination with suitable hydrophobic monomers of type $M_2$.

Hydrophilic monomers of type $M_1$ which require a comonomer for polymerization are maleates, fumarates and vinylethers; the following monomer combinations are, for instance, useful: di(hydroxyalkyl) maleates, such as di(2-hydroxyethyl) maleate, and ethoxylated hydroxyalkyl maleates, hydroxyalkyl monomaleates, such as 2-hydroxyethyl monomaleate and hydroxylated hydroxyalkyl monomaleate with vinyl ethers, vinyl esters, styrene or generally any monomer which will easily copolymerize with maleates or fumarates; hydroxyalkyl vinyl ethers, such as 2-hydroxyethyl vinyl ether, 4-hydroxybutyl vinyl ether, with maleates, fumarates, or generally all monomers which will easily copolymerize with vinyl ethers.

Especially valuable hydrophilic monomers of type $M_1$ are acrylic acid, methacrylic acid, acrylamide, diacetone acrylamide, acrylamidopropane sulfonic acid and salts thereof, and hydroxyethyl methacrylate.

Hydrophobic monomers of the type $M_2$ which do copolymerize with hydrophilic monomers of type $M_1$ are known per se and include acrylates, methacrylates, maleates, fumarates and itaconates with one or more carbons in the ester group, such as methyl, ethyl, propyl, isopropyl, butyl, hexyl, octyl, decyl, dodecyl, 2-ethylhexyl, octadecyl, cyclohexyl, phenyl, benzyl and 2-ethoxyethyl;

Vinyl esters with 1 to 18 carbons in the ester group, such as vinyl acetate, butyrate, laurate, stearate, 2-ethylhexanoate and benzoate; vinyl chloracetate and isopropenyl acetate, vinyl carbonate derivatives;

Styrene and substituted styrenes such as o- and p-methyl, 3,4-dimethyl, 3,4-diethyl and p-chlorostyrene; alpha olefins which include substituted alpha olefins both straight and branched with up to 18 carbon atoms in the side chain including ethylene, propylene and butylene;

Methyl vinyl ether, isopropyl vinyl ether, isobutyl vinyl ether, 2-methoxyethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methylheptyl vinyl ether, n-decyl vinyl ether, n-tetradecyl vinyl ether, and n-octadecyl vinyl;

Vinyl chloride, vinylidene chloride, vinyl fluoride, vinyldene fluoride, acrylonitrile, methacrylonitrile, tetrafluoroethylene, trifluorochloroethylene, hexafluoropropylene;

Dienes particularly 1,3-butadiene, isoprene, and chloroprene, 2-fluoro-butadiene, 1,1,3-trifluorobutadiene, 1,1,2,3-tetrafluorobutadiene, 1,1,2-trifluoro-3,4-dichlorobutadiene and tri- and pentafluorobutadiene and isoprene.

It is well known to the one skilled in the art that mercaptans act as so-called chain transfer agents in free-radical polymerization and copolymerization reaction. The previously listed hydrophilic monomers of type $M_1$ and hydrophobic monomers of type $M_2$ will either homopolymerize and/or copolymerize in the presence of a free-radical initiator and therefore readily react with $R_f$-mercaptans of type II forming the instant $R_f$-oligomers of type I in high yield.

The polymerization reaction is performed in an essentially water free reaction medium, preferably in a lower alcohol such as methanol or isopropanol, or acetone or a lower cellosolve which dissolve the reactants and catalyst.

Generally the oligomerization temperature is maintained at a temperature between 20° and 60° C., but temperatures up to 100° C. may be used as well. Optimum temperature may be readily determined for each oligomerization and will depend on the reaction, the relative reactivity of the monomers and the specific feed-radical initiator used. In order to facilitate the free-radical propagation necessary for an effective catalyst reaction an oxygen-free atmosphere is desirable and the oligomerizations are carried out under nitrogen.

The catalyst employed must be a free-radical initiator, such as the peroxides, persulfates or azo compounds. These materials are well known in the art. However, particularly efficacious results are obtained using organic peroxides and hydroperoxides, hydrogen peroxides, azo catalysts and water soluble persulfates. Specific examples include ammonium persulfate, lauroyl peroxide, tertbutyl peroxide and particularly the azo catalysts 2,2'-azobis(isobutyronitrile); 2,2'-azobis(2,4-dimethylvaleronitrile); 2-tert-butylazo-2-cyanopropane; 1-tert-butylazo-1-cyanocyclohexane; and 2,2'-azobis(2,4-dimethyl-4-methoxyvaleronitrile).

Catalytic amounts of initiator are used, that is between 0.01 and 0.5% by weight of monomers depending on the particular initiator and monomer system. With the preferred azo catalyst from 0.01 to 0.2% by weight of azocatalyst per weight of monomers are used. Using greater amounts of initiator provides no significant advantage.

It is most practical to synthesize the novel $R_f$-oligomers from monomers of type $M_1$ and $M_2$ in a one step polymerization reaction as previously outlined. However, it is also possible, and under certain circumstances necessary, to synthesize the novel $R_f$-oligomers in a two step synthesis. In this alternate synthesis method, hydrolyzable hydrophobic monomers of type $M_2$ are polymerized in the presence of an $R_f$-mercaptan of type II yielding an $R_f$-oligomer containing $-[M_2]-$ monomer units. In a second step, such $R_f$-oligomers are hydrolyzed with a base, preferably alcoholic sodium or potassium hydroxide solution. In this hydrolysis process, selected $-[M_2]-$ monomer units are converted into hydrophilic $-[M_1]-$ monomer units. In this way, vinyl acetate monomer units are converted into vinyl alcohol monomer units or maleate ester units are converted into maleic acid salt units. Similarly, an $R_f$-oligomer containing maleic anhydride monomer units can be hydrolyzed or amidized. This two step approach is, however, more costly than the one step synthesis approach which is preferred and made possible due to the availability of a large number of commercially available hydrophilic monomers of type $M_1$.

In order to synthesize $R_f$-oligomers of type I $$R_f-E-S-[M_1]_x[M_2]_yH-\qquad (I)$$

having the most desirable properties either as a protein foam additive or as a surface tension depressant for aqueous systems, it is necessary to balance the oleophobic and hydrophobic properties of the $R_f-E-S-$ segment versus the hydrophilic properties of the $-[M_1]-$ monomer units and the hydrophobic properties of the $-[M_2]-$ monomer units in the oligomer. In order to achieve a desired balance of properties it can be advantageous to have more than one type of $-[M_1]-$ units and more than one type of $-[M_2]-$ units present in the oligomer. However, it was also found that in many instances the incorporation of hydrophobic $-[M_2]-$ monomer units is not necessary at all to achieve the proper balance of oleophobic/hydrophobic versus hydrophilic properties.

Further, by selecting the chain length of the $R_f$-group and the nature and ratio of the $M_1$ and $M_2$ monomer units it was found that the foam expansion and drainage rate of the protein foam containing the perfluoroaliphatic sulfide terminated oligomers of the instant invention can be modified. In addition to the ability of the artisan to use oligomers of the instant invention to modify the foam expansion of protein fire fighting foams, the instant compositions can be tailored in such a way as to provide improved extinguishing times and the least sensitivity to hydrocarbon pickup with a given protein foam concentrate. For most applications of the novel $R_f$-oligomers it was found desirable to achieve a solubility in water or water-solvent mixtures of at least 0.01% by weight of $R_f$-oligomer. These very small amounts of $R_f$-oligomers already have a significant effect in protein foams.

It was also found that by selecting the proper $M_1$ and $M_2$ type monomers and, even more importantly, by varying the degree of polymerization, i.e. the weight ratio of the $R_f-E-S$ segment versus the segment formed by $-[M_1]_x[M_2]_yH$, $R_f$-oligomers can be prepared which reduce the surface tension of aqueous systems to any desirable degree and as low as 16 dynes/cm. While it is well known that classical fluorochemical surfactants as exemplified in U.S. Pat. Nos. 2,915,544, 3,274,244, 3,621,059 and 3,668,233 do reduce surface tensions of water as low as 15 dynes/cm, it is also well known that for many end uses such extreme low surface tensions are not required which in many cases eliminates the use of the very high priced fluorochemical surfactants. With the instant $R_f$-oligomers it is possible to tailor $R_f$-oligomer compositions which provide any desirable surface tension in water between 76 dynes/cm and about 16 dynes/cm as exemplified later. This possibility to design $R_f$-oligomers providing any desired range of surface tension properties make the novel $R_f$-oligomers a very cost efficient class of surface tension depressants which have utilities in many fields of applications where commonly more expensive classical fluorochemical surfactants are being used as additives. The novel $R_f$-oligomers can therefore be used in applications where improved wetting and spreading of liquids on difficult to wet substrates or substrates contaminated with oil or silicones is required. Application areas where these properties of aqueous systems containing $R_f$-oligomers are required include:

Printing inks, paints, metal and can coatings,
Floor, furniture and automobile polishes,
Cleaners and grease removers,
Photographic, insecticidal, herbicidal and bacteriostatic emulsions and dispersions,
Pigment and dyestuff dispersions and fiber, textile, and leather finishes,
Consumer and personal care products such as hair sprays, shampoos and conditioners, shaving creams and skin protection products,
Oil recovery systems and fracturing fluids, and many other areas where classical fluorochemical surfactants are being used.

Novel $R_f$-oligomers of the type I $$R_f-E-S-[M_1]_x[M_2]_yH \qquad (I)$$

can be prepared from a wide variety of $R_f$-mercaptans of type II $$R_f-E-SH \qquad (II)$$

and a vast number of commercially available monomers of type $M_1$ and $M_2$ as defined previously. It was found, however, that certain $R_f$-mercaptans and monomers are preferred either because of availability or ease of synthesis and most importantly because of performance characteristics. In such preferred $R_f$-oligomers of type I $R_f$ is a perfluoroalkyl group with 6 to 14 carbon atoms,
E is alkylene, preferably ethylene, $$-[M_1]-\text{ is }-[CH_2-\underset{T_1}{\underset{|}{\overset{R_1}{\overset{|}{C}}}}]-,\ -[CH_2-\underset{T_2}{\underset{|}{CH}}]-\text{ or }-[\underset{T_3}{\underset{|}{CH}}-\underset{T_4}{\underset{|}{CH}}]-$$

wherein
$T_1$ is —COOMe; —CONH$_2$; —CONHR$_2$; —CONH$_2$R$_3$; —CONH—E$_1$—NR$_2$R$_3$; —CON- H—E$_1$—NR$_2$R$_3$R$_4$X; —CONHCH$_2$OH; —CONHCH$_2$OR$_2$; —CONHE$_2$OH; —CO(O-E$_1$)$_n$OR$_1$; —COOCH$_2$CHOHCH$_2$OH; —CONH—E$_2$—SO$_3$Me; —CON(E$_1$OH)$_2$ T$_2$ is —OH; —OE$_2$OR$_1$; —(OE$_1$)$_n$OR$_1$; —SO$_3$Me; —C$_6$H$_4$SO$_3$Me;

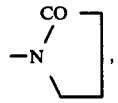

pyridinium halide, —NHCOR$_1$, —NH$_2$

T$_3$ & T$_4$ are independently —COOMe; —CONH$_2$; —CO(OE$_1$)$_n$OR$_1$; —CONH—E$_1$—OH; —CON(E$_1$—OH)$_2$ R$_1$ is hydrogen or methyl R$_2$,R$_3$,R$_4$ are independently alkyl with 1 to 6 carbons E$_1$ is alkylene with 2 or 3 carbons E$_2$ is alkylene with 2 to 6 carbons Me is hydrogen or alkali metal X is halide and n is 1 to 20

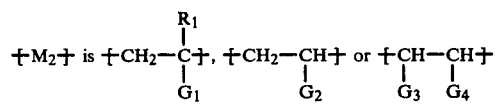

wherein

G$_1$ is —COOR$_5$; —OCOR$_2$; —CN; —OR$_5$; —C$_6$H$_5$; —C$_6$H$_4$X

G$_2$ is —H, R$_2$ or halide

G$_3$ and G$_4$ are independently —COOR$_5$ or combined can be —CO—O—CO—

R$_1$,R$_2$,X are as previously defined

R$_5$ is alkyl with 1 to 18 carbons or cycloalkyl, aryl, alkenyl with 6 to 18 carbons The sum of x and y is between 4 and about 500; and x/(x+y) is between 0.5 and 1.

More preferably, the sum of x and y is between 10 and about 200, most preferably between 10 and about 100 and x/(x+y) is about 0.5 to 1.

Most preferred R$_f$-oligomers have the structure R$_f$—E-[M$_1$]$_x$H, wherein R$_f$ is linear perfluoroalkyl with 6 to 12 carbon atoms E is —CH$_2$CH$_2$—

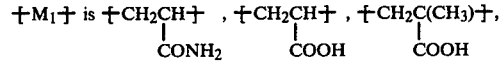

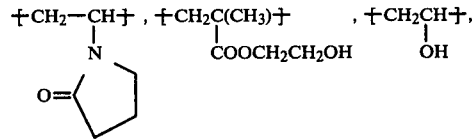

and x is 4 to 50.

Most preferred R$_f$-oligomers used as protein foam additives have the above listed structure R$_f$—E—S-[M$_1$]$_x$H wherein -[M$_1$]- is

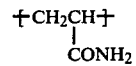

and x varies from 10 to 50.

As stated before, the novel R$_f$-oligomers are particularly useful as additives to protein foam concentrates used as fire fighting foams. Such so-called fluoroprotein foam concentrates containing the novel R$_f$-oligomers show excellent foam expansion ratios, a desirable slow foam drainage rate, and high tolerance to fuel contamination. As a result such fluoroprotein foams do control and extinguish difficult to fight fuel fires and form a secure and longer lasting foam blanket which supresses the release of flammable vapors, has great stability and heat resistance, provides effective sealing against hot tank walls and has high resistance to reignition and burn back.

Other factors distinguishing superior fluoroprotein compositions are the extinguishment of rim fires, smoothness of the foam blanket and minimal charring characteristics. The subject oligomeric surfactants confer these outstanding properties on fluoroprotein foam fire extinguishing agents. Such fluoroprotein foam concentrates can be proportioned (diluted) directly with fresh or sea water and show excellent long-term stability. They can be applied directly to the surface on spill fires or by subsurface application methods as in tank farm protection systems. In such systems, the aqueous fluoroprotein foam is introduced beneath the surface of the burning liquid and rises to the surface where the foam spreads and extinguishes the fire.

In the process of extinguishing a fire wherein the instant fluoroprotein foam fire-fighting compositions are used in conjunction with a dry powder fire-extinguishing material, a dry powder fire extinguishing material is first applied to a combustible material (usually a flammable liquid) to extinguish the fire and then the fluoroprotein foam composition, described supra, is applied to the surface to cover the cumbustible material to prevent reignition of said material by hot surfaces.

Protein foams are available commercially as concentrates for either 3% or 6% proportioning. This means that when these concentrates are used the 3% concentrate is mixed with fresh or sea water in a ratio of 3 volumes of concentrate to 97 volumes of water. Similarly, the 6% concentrate is mixed with fresh or sea water in a ratio of 6 volumes of concentrate to 94 volumes of water. Thus the subject oligomers are incorporated in a 3% type concentrate in amounts varying from about 0.1% to about 10%. Similarly, the oligomers are incorporated into a 6% type concentrate in amounts varying from about 0.2% to about 20%. The actual amount depends upon the effects desired.

EXAMPLES

The following is a list of examples to illustrate the preparation and the usefulness of the oligomers of this invention. The examples are for illustrative purposes only and are not to be construed as limiting in any fashion.

In the following examples, R$_f$ refers to a mixture of perfluoroalkyl groups in approximately the following weight ratio unless otherwise indicated:

C$_6$F$_{13}$/C$_8$F$_{17}$/C$_{10}$F$_{21}$=essentially 34%/38%/23% and may also contain $C_{12}F_{25}$. Still higher perfluoroalkyl groups may be present in small amounts.

Examples 1 to 73 illustrate the methods of preparation of the instant oligomers. Examples 74 to 136 show how they can be used to modify the foam expansion ratio and drainage rate to protein foams. Finally, examples 137 to 162 exemplify utility of the oligomers in resin and coating systems.

The preparation of the oligomers is straightforward and reaction occurs readily in the absence of air or oxygen as evidenced by the appearance of solid which precipitates within a few hours in many cases. Oligomers have been characterized directly using HPLC (high performance liquid chromatography) techniques. Product formation is confirmed also by complete disappearance of mercaptan determined by iodine test and almost complete consumption of monomer as determined specifically by HPLC. Oligomers are characterized by their water solubility, aqueous surface tension reduction capabilities, and their effect upon protein foam characteristics.

The structures indicated for the oligomer showing single values for $x+y$ is idealized. HPLC analysis shows such products to be composed of a distribution of compositions centered about the single value of $x+y$.

EXAMPLE 1

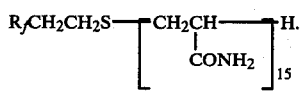

To a 4 liter reactor are charged 0.73 kgs. of methanol, and then simultaneously two reactor streams, one containing 0.64 kgs. acrylamide in 0.64 kgs. methanol and the other 0.28 kgs. $R_fCH_2CH_2SH$, 0.28 kgs. methanol and 0.6 g. Vazo 52. These reactant ratios correspond to a 1 mole $R_fCH_2CH_2SH$ to 15 moles acrylamide. The two streams are added to the reactor over a period of 2 hrs. at 58°–63° C. resulting in a continuous formation of telomeric product while permitting safe, complete control of the exothermic oligomerization. At the end of the charge the reaction is held for 4 hrs. at 58°–63° C. while an additional 0.06 g charge of Vazo 52 in methanol is added. The product is the diluted to 20% actives with water, resulting in a clear solution suitable for use as an additive in fire-fighting applications.

High pressure liquid chromatography (HPLC) analysis of the product, using ultraviolet (UV) (215 nm) detection and gradient, reversed phase elution techniques showed the presence of a distribution of products under an envelope.

Consumption of acrylamide monomer was confirmed, again by HPLC analysis of the product using UV detection and gradient elution techniques.

The surface tension of the product follows:

| % Actives | 0.001 | 0.01 | 0.1 |
|---|---|---|---|
| Surface Tension dynes/cm | 62 | 30 | 21 |
| $R_f$-Distribution %: $C_6$, $C_8$, $C_{10}$, $C_{12}$: 34, 36, 23, 5 | | | |

EXAMPLES 2-7

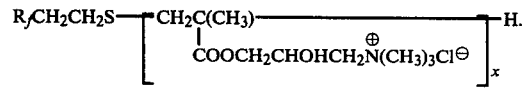

In 4 ounce glass bottles were added the $R_fCH_2CH_2SH$, 3-trimethylammonio-2-hydroxypropyl methacrylate chloride (Sipomer Q-1, from Alcolac Company), 34.5 grams methanol solvent for 25% solids solution and 0.15 gram 2,2'-azobis(2,4-dimethylvaleronitrile) (Vazo 52, azo polymerization initiator from DuPont). The bottles were then purged with nitrogen, sealed and placed in a water shaker bath at 58° C. for about 18 hours. Both the initial reaction mixture and final products were clear solutions in methanol. At the end of the reaction period, the contents of the bottles were dried to give a solid product by heating for 20 hours in a 75° C. draft-oven and finally for 5 hours at 40° C. in a vacuum oven at 0.2 mm. The resulting products obtained in essentially quantitative yield were light amber brittle solids.

On Table 1 are given the experimental data for preparation of these various $R_f$ oligomers. On Table 2 are given the surface tension values for the $R_f$ oligomers both at 0.1% solids.

TABLE 1

| | $R_fCH_2CH_2SH$ MW = 465 | | Sipomer Q-1 MW = 238 | | |
|---|---|---|---|---|---|
| Example | Moles | Weight (g) | Moles | Weight (g) | Value of (x) |
| 2 | 0.007 | 3.3 | 0.035 | 8.3 | 5 |
| 3 | 0.004 | 1.9 | 0.04 | 9.5 | 10 |
| 4 | 0.0018 | 0.84 | 0.045 | 10.7 | 25 |
| 5 | 0.0006 | 0.24 | 0.047 | 11.2 | 75 |
| 6 | 0.00024 | 0.11 | 0.048 | 11.4 | 200 |
| 7 | None | | 0.048 | 11.4 | — |

TABLE 2

| Product of Example | Value of (x) | Surface Tension dynes/cm in deionized water at 25° C. at 0.1% Solids in Solution |
|---|---|---|
| 2 | 5 | 24 |
| 3 | 10 | 24 |
| 4 | 25 | 27 |
| 5 | 75 | 33 |
| 6 | 200 | 40 |
| 7 | — | 58 |

EXAMPLE 8

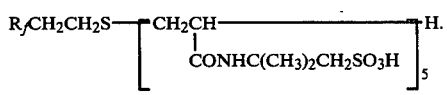

Following the general procedure of Examples 2–7, 2.35 grams (0.005 mole) of $R_fCH_2CH_2SH$, 5.2 grams (0.025 mole) of 2-acryloylamido-2-methylpropanesulfonic acid ("AMPS" monomer from Lubrizol), 22.7 grams of methanol solvent and 0.06 gram of azo catalyst (Vazo 52) were reacted. The final product was a white powder (% F calculated at 20.5%; found 17.1%) which gave surface tension values (dynes/cm) in deionized water at 25° C. of 26 at 0.1% solids; 33 at 0.01% solids and 53 at 0.001% solids.

EXAMPLE 9

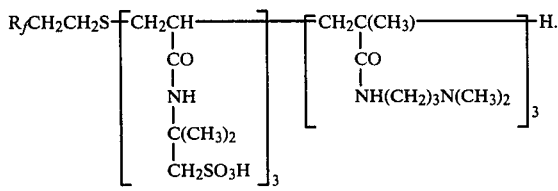

Following the general procedure of Examples 2–7, the following materials were added in this order to an 8 ounce bottle: 59.7 grams isopropanol solvent, 9.3 grams (0.045 mol) 2-acryloylamido-2-methylpropanesulfonic acid, 7.7 grams (0.045 mol) N-(3-dimethylaminopropyl)-methacrylamide (DMAPMA, from Jefferson Chemical Company), 8.3 grams (0.015 mole) R$_f$CH$_2$CH$_2$SH and finally 0.25 gram (0.001 mole) azo catalyst (Vazo 52). The mixture became homogeneous on initial warming and was reacted for 19 hours at 60° C. A white precipitate resulted at the end of the reaction. The contents of the bottle were placed in a blender with 500 ml of dry methyl ethyl ketone to give a pulverized powder which was isolated by filtration and dried for 2.5 hours at 50° C. under 0.2 mm. vacuum. The oligomeric amphoteric product was isolated as a water soluble, white powder in a yield of 22.2 grams (86.8% of theory). A water solution of the product foamed when shaken.

The surface tension values (dynes/cm) in deionized water at 25° C. for this product were 33 at 0.1% solids, 34 at 0.01% solids, 45 at 0.001% solids and 63 at 0.0001% solids.

EXAMPLES 10–11

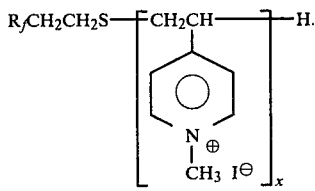

Using 8 ounce bottles, R$_f$CH$_2$CH$_2$SH, 4-vinylpyridine, sufficient isopropanol to give 30% by weight solids solutions and 0.25 gram (0.001 mole) of azo catalyst (Vazo 52) were mixed. The bottles were purged with nitrogen, sealed and placed in a water shaker-bath at 58° C. for 18 hours. The initial mixtures were nearly homogeneous solutions.

In a second step, methyl iodide in an equal weight of isopropanol was then added to the reaction mixtures in the bottles and reaction continued for 1 hour at 60° C. The solid products were isolated by evaporating the solvent in a 75° C. draft oven followed by 2 days at 75° C. under 50 mm vacuum. The products formed cloudy solutions in water which foamed when shaken.

On Table 3 are given the experimental data for the preparation of these various cationic oligomers.

On Table 4 are given the description of the products and surface tension values (dynes/cm) in deionized water at 25° C.

TABLE 3

| | R$_f$CH$_2$CH$_2$SH MW 465 | | 4-Vinylpyridine MW 105 | | Value of (x) | Methyl Iodide MW 142 | |
|---|---|---|---|---|---|---|---|
| Example | Moles | Weight (grams) | Moles | Weight (grams) | | Moles | Weight (grams) |
| 10 | 0.02 | 9.3 | 0.10 | 10.5 | 5 | 0.10 | 14.2 |
| 11 | 0.015 | 7.0 | 0.15 | 15.8 | 10 | 0.15 | 21.3 |

TABLE 4

| | | Yield | | Value of (x) | Surface Tension dynes/cm 25° C. in deionized water (% Solids in Solution) | |
|---|---|---|---|---|---|---|
| Example | Physical State | grams | % theory | | 0.1% | 0.01% |
| 10 | green-yellow solid | 32.8 | 97 | 5 | 21 | 37 |
| 11 | amber solid | 42.5 | 97 | 10 | 22 | 41 |

EXAMPLES 12–14

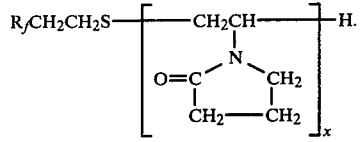

In the following manner with actual amounts shown in Table 5, examples 12–14 were prepared in a 1000 ml, three-necked flask fitted with mechanical stirrer, thermometer, nitrogen inlet tube and drying tube were added in order R$_f$CH$_2$CH$_2$SH, N-vinyl-2-pyrrolidone, cellosolve solvent and azo catalyst (Vazo 52). The systems were kept under nitrogen and slowly heated to 60° C. with stirring being maintained at 59°–63° C. for 17 hours. The nominal 37.5% solids solutions in cellosolve were cooled to 30° C. and diluted with water with stirring. The resulting clear light yellow solutions were filtered to insure clarity. Actual solids (actives) content was obtained by evaporating the filtered solutions in a 60° C. draft oven overnight.

On Table 5 are given specific experimental data for preparing these non-ionic oligomers with various values of x.

TABLE 5

| Example | 12 | 13 | 14 |
|---|---|---|---|
| R$_f$CH$_2$CH$_2$SH | | | |
| grams | 69.8 | 21.3 | 6.1 |
| moles | 0.15 | 0.046 | 0.013 |

TABLE 5-continued

| Example | 12 | 13 | 14 |
|---|---|---|---|
| N—vinyl-2-pyrrolidone | | | |
| grams | 200 | 203.5 | 174 |
| moles | 1.8 | 1.83 | 1.56 |
| Ethyl Cellosolve | | | |
| grams | 450 | 375 | 300 |
| Azo catalyst | | | |
| grams | 0.67 | 0.57 | 0.45 |
| moles | 0.0027 | 0.0023 | 0.0018 |
| Water (dilution) | | | |
| grams | 180 | 300 | 420 |
| x (approximate) | 12 | 40 | 120 |
| Nominal Composition (wt. %) | | | |
| Ethyl Cellosolve | 50 | 41.7 | 33.3 |
| Water | 20 | 33.3 | 46.7 |
| Solids (actives) | 30 | 25 | 20 |
| Fluorine content of solids % | | | |
| Calculated | 17.2 | 6.3 | 2.2 |
| Found | 15.6 | 5.5 | 1.8 |
| Surface Tension dynes/cm in deionized water at 25° C. of solids at | | | |
| 0.001% | 56 | 59 | 65 |
| 0.01% | 27 | 27 | 46 |
| 0.1% | 19 | 20 | 21 |

EXAMPLES 15–17

Using the general procedure of Examples 12–14, additional samples of non-ionic oligomer with varying values of x were prepared.

TABLE 6

| Example | 15 | 16 | 17 |
|---|---|---|---|
| $R_fCH_2CH_2SH$ | | | |
| grams | 12.4 | 6.0 | 3.4 |
| moles | 0.027 | 0.013 | 0.007 |
| N—vinyl-2-pyrrolidone | | | |
| grams | 355.5 | 355.5 | 361 |
| moles | 3.2 | 3.2 | 3.25 |
| Ethyl Cellosolve | | | |
| grams | 613 | 602 | 607 |
| Azo catalyst | | | |
| grams | 0.92 | 0.90 | 0.91 |
| moles | 0.0037 | 0.0036 | 0.0037 |
| Water (dilution) | | | |
| grams | 859 | 844 | 851 |
| x (approximate) | 120 | 250 | 450 |
| Calculated % solids (actives) | 20 | 20 | 20 |
| Surface Tension dynes/cm in deionized water at 25° C. of solids at | | | |
| 0.001% | 66 | 63 | 68 |
| 0.01% | 42 | 51 | 59 |
| 0.1% | 20 | 27 | 32 |

EXAMPLES 18–24

Using the general procedure of Examples 12–14, $R_fCH_2CH_2SH$, N-vinyl-2-pyrrolidone, sufficient acetone solvent to give 25% solids solution and azo catalyst (Vazo 52) were reacted at 60° C. for 18 hours.

On Table 7 are listed the experimental data for these non-ionic oligomers which were prepared as white solids in essentially quantitative yield.

TABLE 7

| Example | 18 | 19 | 20 | 21 | 22 | 23 | 24 |
|---|---|---|---|---|---|---|---|
| $R_fCH_2CH_2SH$ | | | | | | | |
| grams | 9.3 | 7.0 | 4.6 | 1.4 | 0.62 | 0.31 | 0.20 |
| moles | 0.02 | 0.015 | 0.01 | 0.003 | 0.0013 | 0.0007 | 0.0004 |
| N—vinyl-2 Pyrrolidone | | | | | | | |
| grams | 11.1 | 16.7 | 16.7 | 10.0 | 11.1 | 11.1 | 11.6 |
| moles | 0.10 | 0.15 | 0.15 | 0.09 | 0.1 | 0.1 | 0.105 |
| Acetone | | | | | | | |
| grams | 61 | 71 | 64 | 34 | 35 | 34 | 36 |
| Azo Catalyst | | | | | | | |
| grams | 0.20 | 0.20 | 0.20 | 0.15 | 0.15 | 0.15 | 0.15 |
| moles | 0.0008 | 0.0008 | 0.0008 | 0.0006 | 0.0006 | 0.0006 | 0.0006 |
| x (approximate) | 5 | 10 | 15 | 30 | 75 | 150 | 250 |
| Surface Tension dynes/cm at 25° C. in deionized water of solids at | | | | | | | |
| 0.001% | 46 | 48 | 48 | 55 | 64 | 64 | — |
| 0.01% | 20 | 22 | 23 | 23 | 42 | 48 | — |
| 0.1%* | 17 | 18 | 18 | 18 | 18 | 20 | 21 |

*Poly(vinylpyrrolidone) alone at 0.1% = 65 dynes/cm

EXAMPLES 25–28

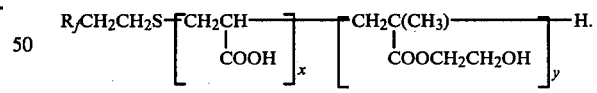

$$R_fCH_2CH_2S\text{-}\left[\begin{array}{c}CH_2CH\\|\\COOH\end{array}\right]_x\left[\begin{array}{c}CH_2C(CH_3)\\|\\COOCH_2CH_2OH\end{array}\right]_y\text{-}H.$$

Using the general procedure of Example 9, $R_fCH_2CH_2SH$, acrylic acid, 2-hydroxyethyl methacrylate, sufficient acetone solvent to give 30% solids solutions and azo catalyst (Vazo 52) were reacted at 60° C. for 19 hours. After evaporation of solvent, the products were isolated in essentially quantitative yield as white solids soluble in an aqueous ethyl cellosolve solution.

On Table 8 are given the experimental data for preparing these oligomeric materials.

TABLE 8

| Example | 25 | 26 | 27 | 28 |
|---|---|---|---|---|
| $R_fCH_2CH_2SH$ | | | | |
| grams | 9.3 | 9.3 | 9.3 | 9.3 |
| moles | 0.02 | 0.02 | 0.02 | 0.02 |
| Acrylic acid | | | | |

TABLE 8-continued

| Example | 25 | 26 | 27 | 28 |
|---|---|---|---|---|
| grams | 2.9 | 5.8 | 8.7 | 11.5 |
| moles | 0.04 | 0.08 | 0.12 | 0.16 |
| 2-hydroxyethyl methacrylate (HEMA) | | | | |
| grams | 20.8 | 15.6 | 10.4 | 5.2 |
| moles | 0.16 | 0.12 | 0.08 | 0.04 |
| Acetone | | | | |
| grams | 77 | 72 | 66 | 61 |
| Azo Catalyst | | | | |
| grams | 0.25 | 0.25 | 0.25 | 0.25 |
| moles | 0.001 | 0.001 | 0.001 | 0.001 |
| x (approximate) | 2 | 4 | 6 | 8 |
| y (approximate) | 8 | 6 | 4 | 2 |
| Surface Tension dynes/cm at 25° C. in deionized water of solids at | | | | |
| 0.01% | 27 | 27 | 35 | 43 |
| 0.1% | 23 | 23 | 23 | 23 |

EXAMPLES 29–31

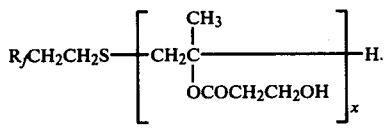

Using the general procedure of Example 1, $R_fCH_2CH_2SH$, 2-hydroxyethyl methacrylate, acetone solvent and 0.25 gram (0.001 mole) of azo catalyst (Vazo 52) were reacted for 17 hours at 60° C. Sufficient acetone solvent was used to give 30% solids solutions. The products were isolated as white crystalline solids in essentially quantitative yield. The solids were soluble in aqueous ethyl cellosolve solution.

On Table 9 are given the experimental data for preparing these oligomeric materials.

TABLE 9

| Example | 29 | 30 | 31 |
|---|---|---|---|
| $R_fCH_2CH_2SH$ | | | |
| grams | 9.3 | 7.0 | 4.6 |
| moles | 0.02 | 0.015 | 0.01 |
| 2-Hydroxyethyl methacrylate (HEMA) | | | |
| grams | 13.0 | 19.5 | 19.5 |
| moles | 0.10 | 0.15 | 0.15 |
| Acetone | | | |
| grams | 52 | 62 | 56 |
| x (approximate) | 5 | 10 | 15 |

EXAMPLES 32–35

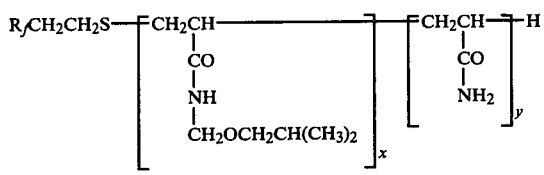

Using the general procedure of Example 1, $R_fCH_2CH_2SH$, N-(isobutoxymethyl)acrylamide, acrylamide, acetone solvent and 0.15 gram (0.0006 mole) of azo catalyst (Vazo 52) were reacted at 58° C. for 5.5 hours. Sufficient acetone was used to give 25% solids solutions. The solid products were isolated in essentially quantitative yield.

On Table 10 are given the experimental data for preparing these oligomeric materials.

TABLE 10

| Example | 32 | 33 | 34 | 35 |
|---|---|---|---|---|
| $R_fCH_2CH_2SH$ | | | | |
| grams | 5.8 | 4.7 | 3.5 | 2.8 |
| moles | 0.0125 | 0.01 | 0.0075 | 0.006 |
| N—(isobutoxymethyl) acrylamide | | | | |
| grams | 9.8 | 7.9 | 5.9 | 4.7 |
| moles | 0.0625 | 0.05 | 0.0375 | 0.03 |
| Acrylamide | | | | |
| grams | — | 3.6 | 5.3 | 6.4 |
| moles | — | 0.05 | 0.075 | 0.09 |
| Acetone | | | | |
| grams | 47 | 48 | 44 | 42 |
| x (approximate) | 5 | 5 | 5 | 5 |
| y (approximate) | 0 | 5 | 10 | 15 |

EXAMPLES 36–40

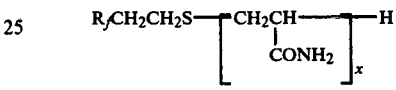

The following examples were prepared from $R_fCH_2CH_2SH$ and acrylamide using a Vazo 52 catalyst. The reactions were run in isopropanol at 60° C. for 60 hours at 20% solids and then diluted with water to 7% solids for analysis.

TABLE 11

| Example | 36 | 37 | 38 | 39 | 40 |
|---|---|---|---|---|---|
| $R_fCH_2CH_2SH$ moles[a] | 0.01 | 0.01 | 0.01 | 0.01 | 0.01 |
| Acrylamide moles | 0.05 | 0.10 | 0.15 | 0.25 | 0.25 |
| x value | 5 | 10 | 15 | 25 | 50 |
| Surface Tension, 0.01% dynes/cm | 19.4[b] | 22.8 | 26.5 | 34.8 | 44.5 |

[a] $R_f$ distribution, %; $C_6$; $C_8$; $C_{10}$; $C_{12}$; 33, 38, 23, 5
[b] Cloudy

EXAMPLES 41–42

In order to show the effect of the $R_f$ chain length of the oligomers on the foam expansion ratio the following oligomers were synthesized:

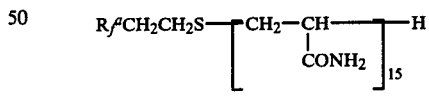

[a] Example 41: $R_f = C_6F_{13}$
Example 42: $R_f = C_8F_{17}$

In one pint bottles were charged 10.8 grams $C_6F_{13}CH_2CH_2SH$ (or 13.55 gms $C_8F_{17}CH_2CH_2SH$), 30 grams of acrylamide, 132.4 gms isopropyl alcohol (IPA) and 0.03 gms of Vazo 52. The bottles were purged thoroughly with nitrogen and placed in a 75° C. bath overnight. The resulting mixtures were isolated as 20% solids, 25% IPA, 55% water by evaporating IPA and charging water.

The products were analyzed by HPLC to show a distribution of components under an envelope. The $C_8F_{17}$ derivative distribution envelope centered at longer retention time than did the $C_6F_{13}$ distribution envelope.

EXAMPLES 43-45

The following examples were prepared from $R_fCH_2CH_2SH$ and acrylamide, using a Vazo 52 (2,2'-azobis-(2,4-dimethylvaleronitrile) catalyst. The reactions were run in acetone at 60° C. for 16 hours at 35% solids and obtained as powders quantitatively by evaporating the solvent at 45° C. in a forced-air oven.

TABLE 12

| Example | 43 | 44 | 45 |
|---|---|---|---|
| $R_fCH_2CH_2SH^a$ g, moles | 4.38, 0.01 | 4.38, 0.01 | 4.38, 0.01 |
| Acrylamide g, moles | 3.55, 0.05 | 7.11, 0.10 | 10.66, 0.15 |
| x value | 5 | 10 | 15 |
| Surface Tension @ 0.1% | 15.6[b] | 16.6 | 16.8 |
| dynes/cm @ 0.01% | 19.2[b] | 19.1 | 22.3 |

[a]$R_f$-distribution, %: $C_6$, $C_8$, $C_{10}$, $C_{12}$; 46, 42, 10, 1
[b]Cloudy

EXAMPLES 46-51

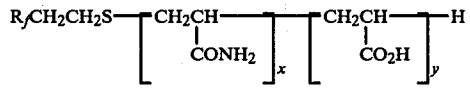

The following materials were added, in this order, to the reaction vessel: acrylamide, acrylic acid, $R_fCH_2CH_2SH$, sufficient isopropyl alcohol to give 20% solids solution and azo catalyst (Vazo 52). The reaction vessel was then purged with nitrogen and placed in a 70° C. bath for 20 hours. The resulting products were placed in a 60° C. draft-oven to remove the solvent and then in a vacuum-oven to remove any unreacted monomers.

Experimental data for preparing these oligomeric materials are given in Table 13. The polymers were all isolated in 90+% yields.

TABLE 13

| Example | | 46 | 47 | 48 | 49 | 50 | 51 |
|---|---|---|---|---|---|---|---|
| $R_fCH_2CH_2SH^a$ | moles | .013 | .013 | .013 | .013 | .013 | .013 |
| Acrylamide | moles | .225 | .247 | .221 | .130 | .026 | — |
| Acrylic acid | moles | .006 | .013 | .039 | .130 | .234 | .260 |
| IPA | grams | 124 | 126 | 126 | 126 | 126 | 125 |
| Azo catalyst | grams | 1.9 | 1.9 | 1.9 | 1.9 | 1.9 | 1.9 |
| x | | 19.6 | 19 | 17 | 10 | 2 | 0 |
| y | | .4 | 1 | 3 | 10 | 18 | 20 |
| % F calculated | | 16.9 | 16.9 | 16.9 | 16.8 | 16.8 | 16.7 |

[a]$R_f$-distribution, % $C_6$, $C_8$, $C_{10}$, $C_{12}$; 33, 36, 23, 7

EXAMPLE 52

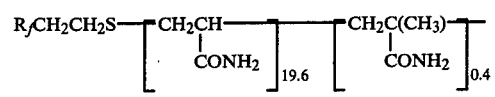

To the reaction vessel were charged-acrylamide (0.255 moles), methacrylamide (0.0052 moles), $R_fCH_2CH_2SH^a$ (0.013 moles), isopropanol (127 grams), Vazo 52 (1.9 grams). The reactor vessel was purged with nitrogen and placed in a 70° C. bath for 20 hours. The product was stripped of solvent in a 60° C. draft-oven and then in a vacuum-oven to remove unreacted monomers. The product was obtained in 93% yield (% F calculated-16.9%).

[a]$R_f$-distribution, % $C_6$, $C_8$, $C_{10}$, $C_{12}$; 33, 36, 23, 7.

EXAMPLES 53-57

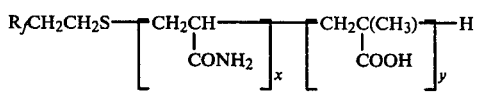

The following materials were added, in this order, to the reaction vessel: acrylamide, methacrylamide, $R_fCH_2CH_2SH^a$, sufficient isopropyl alcohol to give 20% solids solution and azo catalyst (Vazo 52). The reaction vessel was then purged with nitrogen and placed in a 70° C. bath for 20 hours. The resulting products were placed in a 60° C. draft-oven to remove the solvent and then in a vacuum-oven to remove any unreacted monomers.

Experimental data for preparing these oligomeric materials are given in Table 14. The polymers were all isolated in 90+% yields.

Copolymers with high levels of methacrylic acid did not give stable protein foam concentrates.

TABLE 14

| Example | | 53 | 54 | 55 | 56 | 57 |
|---|---|---|---|---|---|---|
| $R_fCH_2CH_2SH^a$ | moles | .013 | .013 | .013 | .012 | .011 |
| Acrylamide | moles | .255 | .247 | .221 | .120 | .022 |
| Methacrylic acid | moles | .005 | .013 | .039 | .120 | .198 |
| IPA | grams | 127 | 125 | 130 | 125 | 120 |
| Azo catalyst | grams | 1.9 | 1.9 | 1.9 | 1.9 | 1.9 |
| x | | 19.6 | 19 | 17 | 10 | 2 |
| y | | .4 | 1 | 3 | 10 | 18 |
| % F calculated | | 16.9 | 16.8 | 16.5 | 15.7 | 14.8 |

[a]$R_f$-distribution, % $C_6$, $C_8$, $C_{10}$, $C_{12}$; 33, 36, 23, 7

EXAMPLE 58

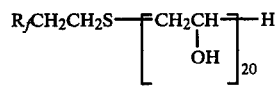

To the reaction vessel, was added $R_fCH_2CH_2SH$ (0.007 moles), vinyl acetate (0.140 moles), sufficient isopropanol to give 20% solids, and azo catalyst [Vazo 52 (0.01% by weight of vinyl acetate)]. The solution was purged with $N_2$ and reacted at 70° C. for 20 hours. The clear yellow liquid thus obtained was hydrolyzed by adding NaOH (5.6 g) and heating @70° C. for 20 hours. The clear orange solution obtained was then dried via a vacuum pump. The % yield was 99.6.

EXAMPLES 59-63

In a similar manner to Examples 44-55, the following monomers, and comonomers were converted to oligomers as given in Table 15. The oligomers were isolated in the reported yield.

TABLE 15
$R_fCH_2CH_2S(MONOMER\ 1)_x\ (MONOMER\ 2)_y$-H

| Example | Monomer 1 | x | Monomer 2 | y | % Yield | % F (calc.) |
|---|---|---|---|---|---|---|
| 59 | Diacetone Acrylamide | 20 | — | — | quant. | 8.3 |
| 60[c] | 2-Hydroxyethyl vinyl ether | 10 | Maleic Anhydride | 10 | 86 | 13.9 |
| 61[a] | Dimethylaminopropyl Methacrylate | 10 | Butyl Methacrylate | 10 | 88 | 8.3 |
| 62 | Acrylamide | 20 | — | 0 | quant. | 16.9 |
| 63[b] | Acrylamide[b] | 20 | — | 0 | quant. | 20.6 |

[a]Concentrate unstable.
[b]$R_f$-distribution, % $C_6$, $C_8$, $C_{10}$, $C_{12-16}$; 0.6, 11, 60, 20+
[c]$R_f$-distribution, % $C_6$, $C_8$, $C_{10}$, $C_{12}$; 33, 36, 23, 7

EXAMPLES 64–73

In a similar manner to Examples 46–57 other fluorinated mercaptans were used as telogens in the preparation of the subject oligomers.

TABLE 16

| Example | Mercaptan | Monomer 1 | x | Monomer 2 | x | % F (Calc.) |
|---|---|---|---|---|---|---|
| 64 | a | Acrylamide | 20 | — | — | 18.3 |
| 65 | a | Acrylamide | 50 | — | — | 8.8 |
| 66 | b | Acrylamide | 20 | — | — | 11.3 |
| 67 | b | Acrylamide | 50 | — | — | 5.1 |
| 68 | a | Acrylamide | 10 | Acrylic Acid | 10 | 18.2 |
| 69 | b | Acrylamide | 10 | Acrylic Acid | 10 | 11.3 |
| 70[c] | a | Acrylic Acid | 3 | — | — | 46.9 |
| 71[c] | a | Acrylic Acid | 5 | — | — | 39.5 |
| 72[c] | b | Acrylic Acid | 3 | — | — | 35.6 |
| 73 | b | Acrylic Acid | 5 | — | — | 28.3 |

[a]$(CF_3)_2CFO(CF_2CF)_{2-4}CH_2CH_2SH$
[b]$(CF_3)_2CFO\ CF_2CF_2CH_2CH_2SH$
[c]Concentrate unstable Oligomers are similarly made using the following fluorinated mercaptans and the numerous monomers described in the foregoing examples.

$C_8F_{17}CH_2CH_2SCH_2CH_2SH$
$C_8F_{17}CH_2CH_2SCH_2CH_2CH_2SH$
$C_8F_{17}CH_2CH_2OCH_2CH_2SH$
$C_8F_{17}CH_2CH_2OCH_2CH_2CH_2SH$
$C_8F_{17}CH_2CH_2N(CH_3)CH_2CH_2CH_2SH$
$(CH_3)_2CF(CF_2)_6CH_2CH_2SH$
$C_8F_{17}SO_2NHCH_2CH_2SH$
$C_8F_{17}SO_2N(CH_3)CH_2CH_2SH$
$C_7F_{15}CONHCH_2CH_2SH$
$C_{10}F_{19}OC_6H_4SH$
$C_8F_{17}CH_2CH_2SO_2NHCH_2CH_2SH$
$C_8F_{17}CH_2CH_2SO_2N(CH_3)CH_2CH_2SH$

Utility of the Oligomers in Protein Foam

The following examples demonstrate the utility of the instant oligomers for use in protein foam. The use of the oligomers in a protein foam base, in addition to reducing the flammability of fuel-foam mixtures and reducing fire extinguishing time, also allows for the adjustment of foam expansion ratio and foam drainage rate in both fresh and sea water dilutions. The first examples show the negative impact of prior art fluorochemical on foam expansion ratio, drainage rate and dilution stability. Subsequently, examples of the instant oligomers as additives in protein foam are presented showing the range of effects on foam expansion and drainage rate.

Foam expansion ratio and drainage rate measurements were carried out using a laboratory branch-pipe nozzle fabricated from $\frac{1}{4}''$ and $\frac{1}{8}''$ stainless steel tubing, operating at a nitrogen pressure of 30 psi and a flow rate of 600 cc/min. 100 cc of protein foam premix was foamed into a conical bottom 2 l graduated cylinder. Foam expansion ratios are calculated from the ratio of volume of foam produced to volume of pre-mix used, with a precision of ±0.2. Drainage rates are expressed as the time, in minutes, required for 25% of original pre-mix volume to accumulate in the conical bottom of the graduated cylinder with a precision of ±0.2 min. This value is called quarter drain time or Q.D.T.

Presentation of foam expansion ratio and drainage rate data in the following tables is in the form of Δ values which show most clearly, the magnitude and direction of the effect of the instant oligomers on protein foam. Therefore a Δ expansion of +1.1 means that the expansion ratio of protein foam with the subject additive is 1.1 units greater than the protein foam expansion ratio when no additive is present.

Prior Art Fluorochemicals in Protein Foam

EXAMPLES 74–85

The following tabulation indicates that conventional fluorochemical surfactants known to the prior-art are deleterious to protein foam expansion and drainage rate. Each surfactant was dissolved in the protein-base (3%) at 0.3% F and tested at 3% dilution in sea water.

TABLE 17

| Example | $R_f$-Surfactant[b] | Source | Sea Water Δ Expansion | Δ QDT |
|---|---|---|---|---|
| 74 | LODYNE S-112 | Ciba-Geigy | −4.3 | −6.0 |
| 75 | Zonyl FSN | DuPont | −7.7 | — |
| 76 | Zonyl FSE | " | −3.5 | −2.5 |
| 77 | Zonyl FSA[a] | " | −1.1 | −0.7 |
| 78 | Zonyl FSB | " | −5.5 | — |
| 79 | Monflor 31 | I.C.I. | −3.3 | −2.7 |
| 80 | Monflor 52 | " | −5.8 | — |
| 81 | Fluorad FC-95 | 3M | −2.8 | −2.6 |
| 82 | Fluorad FC-170 | " | −7.6 | — |
| 83 | Fluorad FC-172 | " | −4.5 | — |
| 84 | Fluorad FC-128 | " | −3.8 | −3.6 |
| 85 | FT 248 | Bayer | −3.4 | −3.2 |

[a]Concentrate stability was poor.
[b]The commercially available surfactants used in the examples are:
FC-95, which is an alkali metal salt of a perfluoroalkylsulfonic acid.
FC-128, which is a perfluoroalkanesulfonamido alkylenemonocarboxylic acid salt as disclosed in U.S. Pat. No. 2,809,990.
FC-170, which is a nonionic perfluoroalkanesulfonamido polyalkylene oxide derivative.
FC-172, which is an amphoteric perfluoroalkylcarboxylate.
Zonyl FSA an anionic derived from linear perfluoroalkyl telomers.
Zonyl FSB, an amphoteric carboxylate derived from linear perfluoroalkyl telomers.
Zonyl FSN, a nonionic derived from linear perfluoroalkyl telomers.
Zonyl FSE, an anionic long chain fluorocarbon derivative.
Monflor 31, an anionic derived from branched tetrafluoroethylene oligomers as disclosed in GB Pat. No. 1,148,486.
Monflor 52, a nonionic derived from branched tetrafluoroethylene oligomers as disclosed in Brit. Pat.,,No. 1,130,822, 1,176,492 and 1,155,607.
FT 248, $C_8F_{17}SO_3^-NC_2H_5)_4$
LODYNE S-112, which is an anionic surfactant/$R_f$-synergist composition as described in U.S. Pat. No. 4,089,804.

EXAMPLES 86-93

The following examples illustrate the improvement which can be attained in the foam expansion of a conventional 3% regular protein foam by the addition of various amounts of the oligomers described in Examples 37 and 38.

TABLE 18
Effect of Additive Oligomer on the Foam Expansion for 3% Tap and 3% Sea Water Dilution

| Example | % Actives in Protein Foam In Concentrate | % Actives in Protein Foam In 3% Dilution | Δ Expansion Example 37 Tap | Δ Expansion Example 37 Sea | Δ Expansion Example 38 Tap | Δ Expansion Example 38 Sea |
|---|---|---|---|---|---|---|
| 86 | 0.00 | 0.00 | 5.3[a] | 6.1[a] | 5.3[a] | 6.1[a] |
| 87 | 0.02 | 0.0006 | 0 | +0.3 | — | — |
| 88 | 0.13 | 0.0033 | +0.8 | +1.1 | — | — |
| 89 | 0.20 | 0.006 | — | — | +1.2 | +1.1 |
| 90 | 0.27 | 0.008 | +0.9 | +1.7 | — | — |
| 91 | 0.50 | 0.015 | +1.0 | +1.9 | +1.5 | +1.7 |
| 92 | 1.00 | 0.03 | +1.3 | +2.1 | +1.9 | +1.6 |
| 93 | 1.50 | 0.045 | — | — | +1.4 | +1.2 |

[a]Actual measured expansion ratios.

EXAMPLES 94-100

The examples in Table 19 below illustrate the inherent stability of the sjubect oligomers in proetin-foam compositions to accelerated aging to 60° C. (140° F.), in contrast to prior-art fluorochemical surfactant containing compositions.

TABLE 19

| Example | Protein-Base | Additives (% Actives) | Δ Expansion[a] Initial | Δ Expansion[a] Aged | Aging Period (days) |
|---|---|---|---|---|---|
| 94 | Aer-o-Foam 3% Reg. (National Foam, Inc.) | None | (6.1[d]) | (6.4[e]) | 6 |
| 95 | Aer-o-Foam 3% Reg. (National Foam, Inc.) | MD 313 (1.5% as is) (I.C.I.) | −1.8 | −2.1 | 6 |
| 96 | Aer-o-Foam 3% Reg. (National Foam, Inc.) | LODYNE S-100 (0.7%) (Ciba-Geigy) | −1.1 | −2.8 | 10 |
| 97 | Aer-o-Foam 3% Reg. (National Foam, Inc.) | [b] | +2.3 | +1.1 | 10 |
| 98 | Aer-o-Foam 3% Reg. (National Foam, Inc.) | Ex. 37 (1%) | +2.1 | +1.7 | 10 |
| 99 | Aer-o-Foam 3% Reg. (National Foam, Inc.) | [c] | — | — | 10 |
| 100 | Aer-o-Foam 3% Reg. (National Foam, Inc.) | Ex. 38 (1.5%) | +0.9 | +1.9 | 10 |

[a]At 3% use dilution in sea water.
[b]Similar to Examples 36-40, but with n = 8.
[c]Similar to Examples 36-40, but with n = 12.5
[d]Measured initial foam expansion ratio.
[e]Measured aged foam expansion ratio.

EXAMPLES 101-105

The results listed in Table 20 show the effects of $R_f$ chain length on the foam expansion ratio of protein foam and also the effects of the change in the valve of x on the foam expansion ratio of protein foam. The measurements were made on 3% fresh water dilutions of AER-O-FOAM 3% REGULAR (National Foam).

TABLE 20
Effect of $R_f$ Length and Value of x on Protein Foam Expansion

| Example | Additive | $R_f$ | x | Δ Expansion |
|---|---|---|---|---|
| 101 | Example 41 | $C_6F_{13}$ | 15 | −2.2 |
| 102 | Example 42 | $C_8F_{17}$ | 15 | +1.9 |
| 103 | Example 36 | $C_6:C_8:C_{10}:C_{12}$ 33:38:23:5 | 5 | −1.7 |
| 104 | Example 37 | $C_6C_8C_{10}C_{12}$ | 10 | −0.4 |
| 105 | Example 38 | $C_6C_8C_{10}C_{12}$ 33:38:23:5 33:38:23:5 | 15 | +0.7 |

EXAMPLES 106-136

Table 21 below further demonstrates the utility of the subject oligomers to allow the adjustment of the foam expansion ratio and the QDT values of protein foam compositions.

TABLE 21
Effect of Example Oligomers on Sea Water Foam Expansion Ratio and QDT Value of Protein Foam

| Example | Additive | Δ Expansion | Δ QDT |
|---|---|---|---|
| 106 | Example 8 | −1.9 | −1.3 |
| 107 | Example 9 | −3.3 | −4.5 |
| 108 | Example 11 | −0.7 | −3.9 |
| 109 | Example 46 | 0 | −1.8 |
| 110 | Example 47 | −1.4 | −1.8 |
| 111 | Example 48 | −0.7 | −1.5 |
| 112 | Example 49 | −1.6 | −1.5 |
| 113 | Example 50 | 0 | +0.7 |
| 114 | Example 51 | 0 | +0.7 |
| 115 | Example 52 | −2.0 | −3.9 |
| 116 | Example 53 | +1.1 | −3.5 |
| 117 | Example 54 | +0.9 | −2.2 |
| 118 | Example 55 | +1.1 | −1.6 |
| 119 | Example 56 | +0.7 | −0.2 |
| 120 | Example 57 | +0.8 | 0 |
| 121 | Example 58 | −0.9 | −4.5 |
| 122 | Example 59 | −1.7 | −3.0 |
| 123 | Example 60 | 0 | 0 |
| 124 | Example 61 | +0.5 | −0.4 |
| 125 | Example 62 | +2.7 | −2.0 |
| 126 | Example 63 | +0.5 | +0.2 |
| 127 | Example 64 | +0.4 | −1.7 |
| 128 | Example 65 | +1.5 | −0.4 |
| 129 | Example 66 | −2.3 | — |
| 130 | Example 67 | −2.5 | — |
| 131 | Example 68 | +1.0 | +0.3 |
| 132 | Example 69 | −1.7 | −2.6 |
| 133 | Example 70 | 0 | −0.3 |
| 134 | Example 71 | −2.5 | −3.5 |
| 135 | Example 72 | −1.8 | −2.3 |
| 136 | Example 73 | −1.1 | −3.3 |

The following examples show the usefulness of the oligomers due to their surface activity in applications other than protein foam.

EXAMPLES 137–144

A water based coating formulation (40.9% solids) was mixed together, consisting of 28.6 parts of water soluble, crosslinkable resin, containing polyethylene oxide segments as water solubilizing units and being derived from diepoxides, 15.4 parts (80% solids in isopropanol) of a crosslinking melamine resin (Uformite, MM-83 from American Cyanamid) and 56 parts water. This aqueous resin was applied with a No. 7 wound wire rod to electrolytic tin plate, which has a remaining layer of a hydrocarbon-type oily impurity from processing and is especially difficult to wet. The samples were cured in a circulating air oven at 200° C. for 10 minutes.

Surface active compounds were incorporated into the formulation to improve wetting, which was judged visually and expressed in percent covered surface area. The results are tabulated below.

TABLE 22

| Ex | Additive Chemical Type | Additive % of Solids* | Coverage % after Cure | Remarks |
|---|---|---|---|---|
| 137 | Control, none | — | 25 | beaded up |
| 138 | Example 32 | 0.55 | 85 | rough crinkled |
| 139 | Example 33 | 0.70 | 95 | slightly crinkled |
| 140 | Example 34 | 0.86 | 100 | smooth |
| 141 | Example 35 | 1.03 | 100 | smooth |
| 142 | Pluronic L-72 (BASF Wyandotte) nonionic hydrocarbon | 1.0 | 50 | |
| 143 | BYK-301 (Mallinckrodt) silicone | 1.0 | 75 | |
| 144 | FC-430 (3M) nonionic fluorinated | 1.0 | 60 | |

*10% solution or emulsion of additive added to formulation to give stated % additive on solids.

Only the novel oligomers (b-e) this invention, especially d-e, essentially prevent a reduction of covered surface area during cure.

EXAMPLES 145–153

Using the procedure of Examples 137–144 other oligomeric additives of the invention were used to improve wetting of cured epoxy coatings as seen on Table 22.

TABLE 23

| Ex | Additive Chemical Type | Additive % of Solids* | Coverage % after Cure | Remarks |
|---|---|---|---|---|
| 145 | Control, none | — | 10 | Very poor |
| 146 | Example 25 | 0.36 | 100 | smooth |
| 147 | Example 26 | 0.34 | 100 | good, few rough spots |
| 148 | Example 27 | 0.31 | 100 | some wrinkles |
| 149 | Example 28 | 0.29 | 100 | wrinkles |
| 150 | Example 29 | 0.19 | 80 | many voids |
| 151 | Example 30 | 0.31 | 85 | many voids |
| 152 | Example 31 | 0.42 | 90 | many voids |
| 153 | Example 31 plus LODYNE S-100 (CIBA-GEIGY) amphoteric fluorinated surfactant | 0.21 0.03 | 60 | poor |

*10% solution or emulsion of additives added to formulation to give stated % additives on solids.

The oligomers of Examples 25–31 also gave improved coverage of cured epoxy coatings. The cured coating of Example 25 was particularly good.

EXAMPLE 154–158

Using the procedure of Example 137–144, still other oligomers were evaluated as additives to improve the coverage of epoxy coatings as seen on Table

TABLE 24

| Ex | Additive Chemical Type | Additive % of Solids* | Coverage % after Cure | Remarks |
|---|---|---|---|---|
| 154 | Control, none | — | 10 | Very poor |
| 155 | Example 18 | 0.30 | 10 | beaded up |
| 156 | Example 19 | 0.46 | 50 | poor |
| 157 | Example 20 | 0.61 | 80 | many small voids |
| 158 | Example 20 plus LODYNE S-100 (CIBA-GEIGY) amphoteric fluorinated surfactant | 0.31 0.30 | 85 | some voids and streaks |

*10% solution or emulsion of additives added to formulation to give stated % additives on solids.

EXAMPLE 159–162

Using an experimental hard-surface cleaner (i.e., floor polish) from Rohm and Haas Company, the oligomers of the instant invention were added to the floor polish formulation in order to improve spreading and leveling characteristics.

The oligomer additives were mixed with the cleaner to give 0.05%F in solution. A 25 ml sample of formulation was placed on a 5 mil aluminum foil sheet using a syringe. The drop was allowed to stand for 5 minutes after which time the diameter of the drop was measured and the area covered was calculated. High numbers for area indicate improved spreading and leveling characteristics. The results are given on Table 25.

TABLE 25

| Ex | Additive Chemical Type | % F in Formulation | Calculated Drop area mm$^2$ | Leveling Rating* |
|---|---|---|---|---|
| 159 | Control, none | — | 70.9 | 8 |
| 160 | Example | 0.05 | 100.3 | 1 |
| 161 | Example | 0.05 | 100.3 | 4 |
| 162 | LODYNE S-100 (CIBA-GEIGY) Amphoteric fluorinated surfactant | 0.05 | 95.0 | 2 |

*Leveling rating = subjective visual observation of dried drop where 1 = best (smoothest, most level); 8 = worst (high ridge around drop, uncoated center area).

What is claimed is:

1. A protein hydrolyzate aqueous foam-forming concentrate composition for making a fire-fighting foam after dilution with from about 15 to about 35 times its volume of water which comprises a water solution of a fire fighting foam-forming protein hydrolyzate containing sufficient protein hydrolyzate to essentially completely stabilize the foam produced after dilution, and in dissolved or dispersed condition an oligomer of the formula

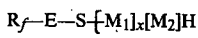
$R_f—E—S—[M_1]_x[M_2]H$ wherein $R_f$ is a straight or branched chain perfluoroalkyl of 4 to 18 carbon atoms, perfluoroalkyloxyalkylene of 5 to 19 carbon atoms, or mixtures thereof;

E is a straight or branched chain alkylene of 1 to 12 carbon atoms, —CON(R')—E'—, —SO$_2$N(R')—E'—, —E''—CON(R')—E'—, —E''—S—E'—, —E''—N(R')—E—, or —E''—SO$_2$N(R')—E'—, where R' is hydrogen or alkyl of 1 to 6 carbon atoms, E' is alkylene of 2 to 8 carbon atoms and E'' is alkylene of 1 to 4 carbon atoms; —M$_1$— represents a hydrophilic monomer unit derived from a hydrophilic vinyl monomer and —M$_2$— represents a hydrophobic monomer unit derived from a hydrophobic vinyl monomer;

the sum of x and y is between 4 and about 500; and x/(x+y) is between 1 and 0.5; in concentration to give from about 0.003 to about 0.3% by weight of said oligomer after dilution.

2. A composition according to claim 1 wherein

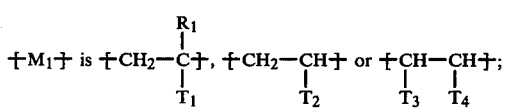

where
T$_1$ is —COOMe; —CONH$_2$; —CONHR$_2$; —CONR$_2$R$_3$; —CONH—E$_1$—NR$_2$R$_3$; —CONH—E$_1$—NR$_2$R$_3$R$_4$X; —CONHCH$_2$OH; —CONHCH$_2$OR$_2$; —CONHE$_2$OH; —CO(OE$_1$)$_n$OR$_1$; —COOCH$_2$CHOHCH$_2$OH; —CONH—E$_2$—SO$_3$Me; or —CON(E$_1$OH)$_2$;

T$_2$ is —OH; —OE$_2$OR$_1$; —(OE$_1$)$_n$OR$_1$; —SO$_3$Me; —C$_6$H$_4$SO$_3$Me;

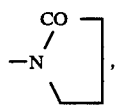

pyridinium halide, —NHCOR$_1$, or —NH$_2$;

T$_3$ and T$_4$ are independently —COOMe; —CONH$_2$; —CO(OE$_1$)$_n$OR$_1$; —CONH—E$_1$—OH; or —CON(E$_1$—OH)$_2$ R$_1$ is hydrogen or methyl;
R$_2$, R$_3$, R$_4$ are independently alkyl with 1 to 6 carbons;
E$_1$ is alkylene with 2 or 3 carbons;

E$_2$ is alkylene with 2 to 6 carbons;
Me is hydrogen or alkali metal;
X is halide; and
n is 1 to 20;

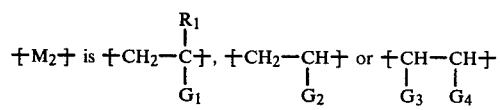

where
G$_1$ is COOR$_5$; —OCOR$_2$; —CN; —OR$_5$; —C$_6$H$_5$; or —C$_6$H$_4$X;
G$_2$ is —H, R$_2$, or halide;
G$_3$ and G$_4$ are independently —COOR$_5$ or combined can be —CO—O—CO—;
R$_1$, R$_2$, X are as previously defined herein;
R$_5$ is alkyl with 1 to 18 carbons, cycloalkyl, aryl, or alkenyl with 6 to 18 carbons; and the sum of x and y is between 4 and about 500; and x/(x+y) is between 0.5 and 1.

3. A composition according to claim 2, wherein R$_f$ is straight or branched chain perfluoroalkyl of 6 to 14 carbon atoms;

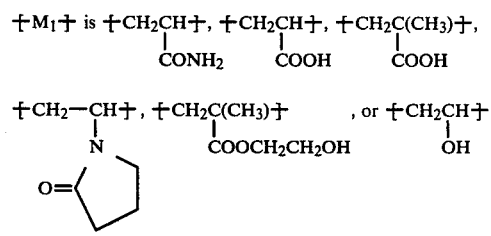

and x is 4 to 50 and y is 0.

4. A composition according to claim 3, wherein R$_f$ is perfluoroalkylene of 6 to 12 carbon atoms, and E is ethylene.

5. A composition according to claim 1, wherein R$_f$ is straight chain perfluoroalkyl of 6 to 14 carbon atoms, E is ethylene, —[M$_1$]— is

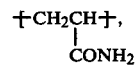

x is 15 to 50 and y is 0.

6. A process for extinguishing a burning hydrophobic liquid in a storage tank or containing vessel which comprises introducing beneath the surface of the burning liquid an aqueous foam, which foam then rises to the surface of said liquid, said foam being prepared from an aqueous concentrate according to claim 1, diluted with about 15 to about 35 times its volume of water.

* * * * *

UNITED STATES PATENT AND TRADEMARK OFFICE
CERTIFICATE OF CORRECTION

PATENT NO. : 4,460,480

DATED : July 17, 1984

INVENTOR(S) : Eduard K. Kleiner, Thomas W. Cooke, and Robert A. Falk

It is certified that error appears in the above-identified patent and that said Letters Patent is hereby corrected as shown below:

Claim 1, Column 25, Line 8 should read--

$$R_f - E - S \left( M_1 \right)_x \left( M_2 \right)_y H$$

--.

Signed and Sealed this

Third Day of September 1985

[SEAL]

Attest:

DONALD J. QUIGG

Attesting Officer     Acting Commissioner of Patents and Trademarks - Designate